Patented Jan. 12, 1926.

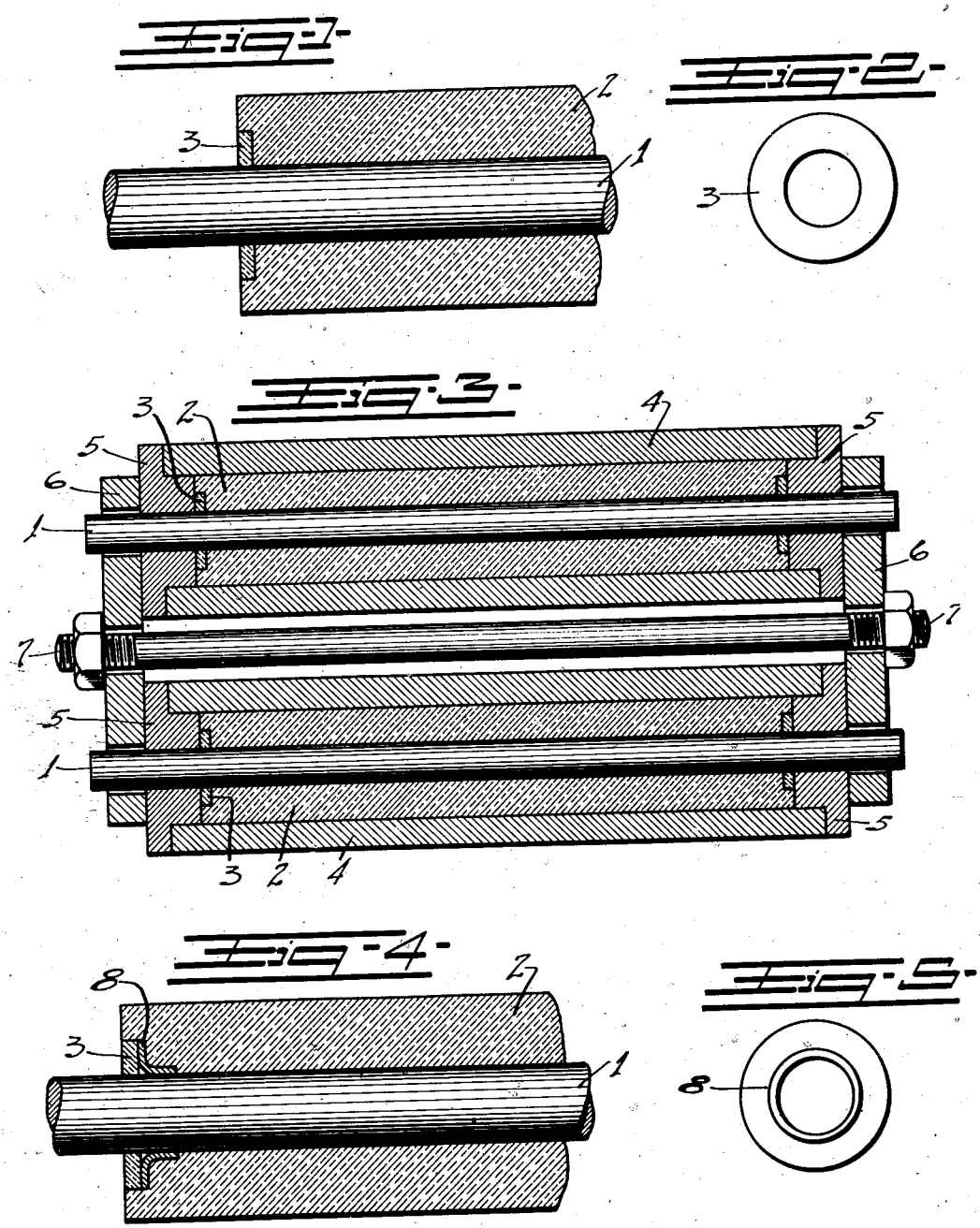

1,569,393

UNITED STATES PATENT OFFICE.

JOHN J. RATHERS, OF ERIE, PENNSYLVANIA, ASSIGNOR TO LOVELL MANUFACTURING COMPANY, OF ERIE, PENNSYLVANIA, A CORPORATION OF PENNSYLVANIA.

RUBBER ROLL.

Application filed November 3, 1923. Serial No. 672,521.

*To all whom it may concern:*

Be it known that I, JOHN J. RATHERS, a citizen of the United States, residing at Erie, in the county of Erie and State of Pennsylvania, have invented new and useful Improvements in Rubber Rolls, of which the following is a specification.

This invention is designed to improve rubber rolls such as are used in wringers and the method by which they are made. As such rolls have been made they have a rubber body which is bonded on a metal rod and the ends of the rolls are confined by metal shoulders, or washers which are secured to the rod. One difficulty with the metal washer is that it is inclined to rust if made of ordinary metal and this rust is conveyed to the surface of the roll and from the roll to the clothes. Furthermore, the present structure is in some of its forms cheaper than the structure using the ordinary metal washer.

The invention is illustrated in the accompanying drawings as follows:—

Fig. 1 shows a section of a rubber roll end.

Fig. 2 a side elevation of a rubber stock to form a washer at the end of the roll.

Fig. 3 a sectional view of roll molds.

Fig. 4 a construction of roll having additional features from that of Fig. 1.

Fig. 5 a side elevation of a metal washer used in the structure shown in Fig. 4.

1 marks the rod and 2 the body of rubber. These are bonded together by the usual method.

A washer 3 formed of hard rubber is arranged at the end of the roll and in the construction shown in Fig. 1 displaces in this construction the usual metal washer.

In forming the roll I prefer to partially vulcanize the stock forming the washer 3 and then complete the vulcanization with the body of the roll. This prevents any running of the washer stock and makes a clean-cut washer outline in the end of the roll. The stock used in the washer and roll should be sympathetic so as to bond together as they are vulcanized.

The rolls are usually vulcanized in molds 4 having the closure caps 5, clamping plates 6 operating on the caps and the clamping bolts 7 extending between the plates 6.

It is desirable to prevent the steam to which the molds are subjected entering between the body of rubber and the rod as this interferes with the bonding of the rubber on the rod. The rubber washer seals the end and prevents this result.

In Fig. 4 the body of the roll is formed between metal washers 8 which are secured to the rod. In order to enclose the metal washer, the hard washer 3 is arranged outside of the metal washer and vulcanized with the roll in the manner above described, the rubber washer preferably bonding with the metal washer and with the rubber of the body of the roll. Where this is done greater strength of the metal washer is secured and the metal is entirely housed so as to prevent any rusting.

What I claim as new is:—

1. A rubber roll comprising a metal rod; a roll body of comparatively soft rubber bonded to the rod; and a washer of comparatively hard rubber at the end of the roll.

2. A rubber roll comprising a metal rod; a roll body of comparatively soft rubber bonded to the rod; and a washer of comparatively hard rubber at the end of the roll bonded to the rod.

3. A rubber roll comprising a metal rod; a roll body of comparatively soft rubber bonded to the rod; and a washer of comparatively hard rubber at the end of the roll bonded to the soft rubber.

4. A rubber roll comprising a metal rod; a roll body of comparatively soft rubber bonded to the rod; and a washer of comparatively hard rubber at the end of the roll bonded to the rod and the rubber body.

5. A rubber roll comprising a metal rod; a roll body of comparatively soft rubber bonded to the rod; a washer of comparatively hard rubber at the end of the roll; and a metal washer between the hard rubber washer and the rubber body, said metal washer being entirely enclosed.

6. A rubber roll comprising a metal rod; a roll body of comparatively soft rubber bonded to the rod; a washer of comparatively hard rubber at the end of the roll; and a metal washer between the hard rubber washer and the rubber body, said metal washer being entirely enclosed, the rubber washer being bonded to the metal washer and to the rubber body.

In testimony whereof I have hereunto set my hand.

JOHN J. RATHERS.